United States Patent
Jiang

(10) Patent No.: US 11,995,921 B2
(45) Date of Patent: May 28, 2024

(54) SCANNING METHOD FOR ELECTRONIC CONTROL UNIT IN VEHICLE AND VEHICLE DIAGNOSTIC DEVICE

(71) Applicant: AUTEL INTELLIGENT TECHNOLOGY CORP., LTD., Guangdong (CN)

(72) Inventor: Yun Jiang, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 488 days.

(21) Appl. No.: 17/235,368

(22) Filed: Apr. 20, 2021

(65) Prior Publication Data
US 2021/0241549 A1    Aug. 5, 2021

Related U.S. Application Data

(63) Continuation of application No. PCT/CN2019/129859, filed on Dec. 30, 2019.

(30) Foreign Application Priority Data

Dec. 29, 2018  (CN) .......................... 201811636856.2

(51) Int. Cl.
*G07C 5/08* (2006.01)
*H04L 12/40* (2006.01)
(Continued)

(52) U.S. Cl.
CPC ...... *G07C 5/0808* (2013.01); *H04L 12/40006* (2013.01); *H04L 69/323* (2013.01);
(Continued)

(58) Field of Classification Search
CPC ... G07C 5/08; G07C 5/0808; H04L 12/40006; H04L 69/323; H04L 69/324; H04L 69/329; H04L 2012/40215; H04L 2012/40273
(Continued)

(56) References Cited

U.S. PATENT DOCUMENTS

| | | | |
|---|---|---|---|
| 8,428,813 B2 * | 4/2013 | Gilbert | G06N 5/04 701/31.4 |
| 9,117,319 B2 * | 8/2015 | Chen | G07C 5/0808 |

(Continued)

FOREIGN PATENT DOCUMENTS

| | | | | |
|---|---|---|---|---|
| AU | 2004307162 A1 * | 5/2006 | | H04L 29/06 |
| AU | 2005253592 A1 * | 1/2007 | | H04L 12/28 |

(Continued)

OTHER PUBLICATIONS

First Chinese Office Action dated Nov. 5, 2019; Appln. No. 201811636856.2 with English Translation.
(Continued)

*Primary Examiner* — Atul Trivedi

(57) ABSTRACT

The present disclosure relates to a scanning method for an electronic control unit in a vehicle and a vehicle diagnostic device. The vehicle diagnostic device is communicatively connected to at least two vehicle buses in the vehicle, each of the vehicle buses is connected to at least one electronic control unit in the vehicle. The scanning method determines a scan list corresponding to each of the vehicle buses. The scan list includes a to-be-scanned electronic control unit. The vehicle diagnostic device transmitting a scan signal on the vehicle buses in parallel according to the scan list corresponding to each of the vehicle buses, to determine whether the to-be-scanned electronic control unit in the scan list exists in the vehicle. The parallel scanning in this way can effectively improve the efficiency of automatic scanning (Continued)

and significantly shorten a time required to complete the automatic scanning, and improves user experience.

16 Claims, 5 Drawing Sheets

(51) Int. Cl.
*H04L 69/323* (2022.01)
*H04L 69/324* (2022.01)
*H04L 69/329* (2022.01)

(52) U.S. Cl.
CPC .......... *H04L 69/324* (2013.01); *H04L 69/329* (2013.01); *H04L 2012/40215* (2013.01); *H04L 2012/40273* (2013.01)

(58) Field of Classification Search
USPC ....................................................... 701/29.1
See application file for complete search history.

(56) References Cited

U.S. PATENT DOCUMENTS

| | | | | |
|---|---|---|---|---|
| 2010/0205450 | A1* | 8/2010 | Sarnacke | B60R 25/00 |
| | | | | 713/185 |
| 2015/0260835 | A1* | 9/2015 | Widmer | H02J 50/90 |
| | | | | 342/27 |
| 2017/0186324 | A1* | 6/2017 | Fish | G06Q 10/0833 |
| 2017/0337068 | A1* | 11/2017 | Maria | H04W 4/40 |
| 2018/0081857 | A9* | 3/2018 | Chen | G06F 17/00 |
| 2018/0345811 | A1* | 12/2018 | Michels | G07C 5/0808 |
| 2023/0373457 | A1* | 11/2023 | Snyder | B61L 29/28 |

FOREIGN PATENT DOCUMENTS

| | | | | |
|---|---|---|---|---|
| CA | 2692530 | A1 * | 8/2010 | ............ B60R 25/00 |
| CN | 201707600 | U | 1/2011 | |
| CN | 103605359 | A | 2/2014 | |
| CN | 103616886 | A | 3/2014 | |
| CN | 106125716 | A | 11/2016 | |
| CN | 106647713 | A | 5/2017 | |
| CN | 106647723 | A | 5/2017 | |
| CN | 206178464 | U | 5/2017 | |
| CN | 107291068 | A | 10/2017 | |
| CN | 109407656 | A | 3/2019 | |
| JP | 2005212618 | A | 8/2005 | |
| WO | WO-2020135863 | A1 * | 7/2020 | ......... G05B 23/0213 |

OTHER PUBLICATIONS

International Search Report dated Mar. 27, 2020; PCT/CN2019/129859 with English Translation.
Auto Maintenance Newest BMW Automobile Maintenance Example edited by Zhou Yang p. 567-568 published Mar. 2014 (cited in First Office Action of Chinese counterpart App. No. 201811636856.2) (English translation included).

* cited by examiner

| Item | Communication protocol | Scan list |
|---|---|---|
| Electronic control unit A | CAN protocol | Scan list 1 |
| Electronic control unit B | CAN protocol | Scan list 1 |
| Electronic control unit C | CAN protocol | Scan list 1 |
| Electronic control unit D | CAN protocol | Scan list 1 |
| Electronic control unit E | ISO9141 protocol | Scan list 2 |
| Electronic control unit F | ISO9141 protocol | Scan list 2 |
| Electronic control unit G | PWM protocol | Scan list 3 |
| Electronic control unit H | PWM protocol | Scan list 3 |

FIG. 3

SCANNING METHOD FOR ELECTRONIC CONTROL UNIT IN VEHICLE AND VEHICLE DIAGNOSTIC DEVICE

CROSS REFERENCE OF RELATED APPLICATIONS

This application is a continuation application of International Application No. PCT/CN2019/129859, filed on Dec. 30, 2019, which claims priority of Chinese Patent Application No. 201811636856.2, filed on Dec. 29, 2018, which is incorporated herein by reference in its entirety.

TECHNICAL FILED

This application relates to the technical field of vehicle diagnostic products, and in particular, to a scanning method for an electronic control unit in a vehicle and a vehicle diagnostic device.

BACKGROUND

During the process of vehicle maintenance and overhaul, when an external interface (such as an OBD interface) of a vehicle diagnostic device is electronically connected to a vehicle, the vehicle diagnostic device usually performs an automatic scanning to detect all electronic control units on the vehicle, and displays an operating status or a presence status of each of the electronic control units to users in a form of fault codes.

However, with the continuous development of electronic information technologies, an explosively growing number of electronic control units are mounted in the vehicles, so as to simplify a driving burden of users and improve driving safety.

The rapid increase in the number of electronic control units has caused a relatively long waiting time to complete when the vehicle diagnostic device performs automatic scanning, which causes inconvenience to the user's daily use.

SUMMARY

Embodiments of the present disclosure are intended to provide a scanning method for an electronic control unit in a vehicle and a vehicle diagnostic device, which can resolve a problem of an excessive time required for existing vehicle diagnostic devices to complete automatic scanning.

In order to resolve the above technical problems, the embodiments of the present disclosure provide the following technical solutions.

A scanning method for an electronic control unit is provided. The scanning method includes communicatively connecting a vehicle diagnostic device to at least two vehicle buses in the vehicle, each of the at least two vehicle buses is connected to at least one electronic control unit in the vehicle. The scanning method further includes determining a scan list corresponding to each of the at least two vehicle buses, the scan list including a to-be-scanned electronic control unit; and transmitting a scan signal on the at least two vehicle buses in parallel according to the scan list corresponding to each of the vehicle buses to determine whether the to-be-scanned electronic control unit in the scan list exists in the vehicle.

In some embodiments, the method further includes a step of determining model information and body style information of the vehicle. Wherein the step of determining a scan list corresponding to each of the at least two vehicle buses includes a step of determining the scan list corresponding to each of the at least two vehicle buses according to the model information and the body style information of the vehicle.

In some embodiments, the step of transmitting a scan signal on the at least two vehicle buses in parallel according to the scan list corresponding to each of the vehicle buses to determine whether the to-be-scanned electronic control unit in the scan list exists in the vehicle includes: simultaneously transmitting an inquiry command to to-be-scanned electronic control units in different scan lists; determining whether reply information returned by the to-be-scanned electronic control unit based on the inquiry command is received within a predetermined time; and if the reply information is not received, determining that the to-be-scanned electronic control unit does not exist in the vehicle.

In some embodiments, after the step of simultaneously transmitting an inquiry command to electronic control units of different scan lists, the method further includes: determining that the to-be-scanned electronic control unit exists when the reply information returned by the to-be-scanned electronic control unit based on the inquiry command is received within the predetermined time; and parsing the reply information to determine an operating status of the to-be-scanned electronic control unit.

In some embodiments, the step of transmitting a scan signal on the at least two vehicle buses in parallel includes: transmitting the scan signal on the at least two vehicle buses in parallel according to a communication protocol corresponding to each of the at least two vehicle buses; and where each of the vehicle buses corresponds to a communication protocol and each communication protocol corresponds to an vehicle bus.

In order to resolve the above technical problem, the embodiments of the present disclosure further provide the following technical solutions. A vehicle diagnostic device is provided. The vehicle diagnostic device includes a device host and a diagnostic connector. The diagnostic connector is configured to connect the device host to an vehicle bus, at least two sets of pins being integrated on the diagnostic connector, each set of pins being connected to an vehicle bus, each of the vehicle buses being configured to be connected to at least one electronic control unit in a vehicle, each of the vehicle buses having a corresponding scan list and the scan list including a to-be-scanned electronic control unit. The device host being communicatively connected to at least two vehicle buses through the diagnostic connector to transmit a scan signal on the at least two vehicle buses in parallel to determine whether the to-be-scanned electronic control unit in the scan list exists in the vehicle.

In some embodiments, the device host is further configured to determine the scan list corresponding to each of the at least two vehicle buses according to model information and body style information of a to-be-scanned vehicle.

In some embodiments, the device host includes an upper computer and a lower computer, the lower computer is electrically connected to the diagnostic connector. The upper computer being communicatively connected to the lower computer to transmit the scan signal on the at least two vehicle buses in parallel through the lower computer. The upper computer including a main scan thread and a plurality of communication threads, the main scan thread being configured to create a corresponding communication thread for each of the vehicle buses and delete the corresponding communication thread after all to-be-scanned electronic control units in the scan list of the vehicle bus are scanned. Different communication threads being executed in parallel, the communication thread being configured to transmit an inquiry command on a corresponding vehicle bus to the to-be-scanned electronic control unit in the scan list, determine whether reply information returned by the to-be-scanned electronic control unit based on the inquiry command is received within a predetermined time and if not, determine that the to-be-scanned electronic control unit does not exist in the vehicle.

In some embodiments, the communication thread is further configured to: determine that the to-be-scanned electronic control unit exists when the reply information returned by the to-be-scanned electronic control unit based on the inquiry command is received within the predetermined time; and parse the reply information to determine an operating status of the to-be-scanned electronic control unit.

In some embodiments, the lower computer includes a link layer and a physical layer. Each of the vehicle buses corresponds to a communication protocol and each communication protocol corresponds to a vehicle bus. The link layer being configured to convert the inquiry command and the reply information to a corresponding binary signal according to the communication protocol corresponding to each of the vehicle buses. The physical layer being configured to convert the binary signal to a physical electrical signal for transmission on the corresponding vehicle bus or receive a physical electrical signal returned by the vehicle bus and convert the physical electrical signal to a corresponding binary signal.

Compared with the prior art, in the scanning method provided in the embodiments of the present disclosure, a plurality of electronic control units are simultaneously detected through parallel scanning by virtue of a characteristic of a plurality of vehicle buses being independent from each other. The parallel scanning in this way can effectively improve the efficiency of automatic scanning and significantly shorten a time required to complete the automatic scanning, and improves user experience.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

FIG. 3 is a schematic diagram of a scan list in accordance with a preferred embodiment of the present disclosure.

DETAILED DESCRIPTION

To facilitate understanding the present disclosure, the present disclosure is further described in more detail below with reference to the accompanying drawings and specific embodiments. It should be noted that, when a component is expressed as "being fixed to" another component, the component may be directly on another component, or one or more intermediate components may exist between the component and another component. When one component is expressed as "being connected to" another component, the component may be directly connected to another component, or one or more intermediate components may exist between the component and another component. In the description of this specification, orientation or position relationships indicated by the terms such as "up", "down", "inside", "outside" and "bottom" are based on orientation or position relationships shown in the accompanying drawings, and are used only for ease and brevity of illustration and description of the present disclosure, rather than indicating or implying that the mentioned apparatus or component must have a particular orientation or must be constructed and operated in a particular orientation. Therefore, such terms should not be construed as limiting of the present disclosure. In addition, terms "first", "second" and "third" are only used to describe the objective and cannot be understood as indicating or implying relative importance.

Unless otherwise defined, meanings of all technical and scientific terms used in the present disclosure are the same as that usually understood by a person skilled in the technical field to which the present disclosure belongs. Terms used in the specification of the present disclosure are merely intended to describe objectives of the specific embodiments, but are not intended to limit the present disclosure. A term "and/or" used in the present disclosure includes any or all combinations of one or more related listed items.

In addition, technical features involved in different embodiments of the present disclosure described below may be combined together if there is no conflict.

An electronic control unit (ECU), which may also be referred to as a trip computer or an on-board computer, is a microcomputer controller dedicated for a vehicle and cooperates with other mechanical hardware devices to implement a certain function (such as automatic braking, tire pressure detection, doubling prompt, or the like).

Figure 1:
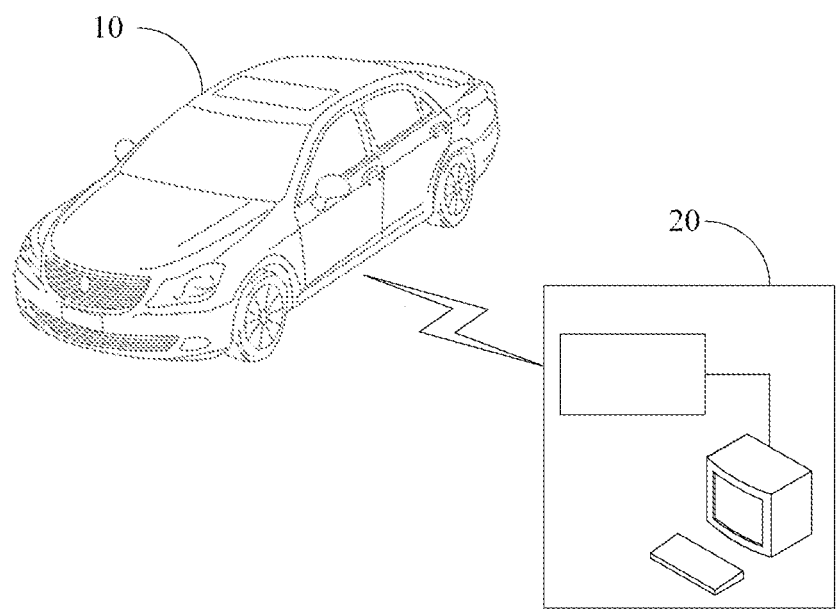
FIG. 1 is a schematic diagram of an application scenario of a vehicle diagnostic device in accordance with a preferred embodiment of the present disclosure.

Automatic scanning by a vehicle diagnostic device refers to a process of detecting all electronic control units in a vehicle to obtain final detection results. The term "scanning" is used herein to refer to a process of determining whether the electronic control unit exists in the vehicle and obtaining a specific status of the electronic control unit. FIG. 1 is a schematic diagram of an application scenario of a vehicle diagnostic device of a vehicle in accordance with a preferred embodiment of the present disclosure.

As shown in FIG. 1, a vehicle 10 and a vehicle diagnostic device 20 are provided in the present application, and the vehicle diagnostic device 20 is communicatively connected to the vehicle 10.

The vehicle 10 may be specifically a motor vehicle of any model and body style, such as a truck, a car, or the like, and has an electronic control system composed of a plurality of electronic control units. The electronic control system coordinates and controls the vehicle in accordance with operation instructions of a driver, and monitors one or more vehicle parameters in real time to ensure reliable and safe running of the vehicle 10.

Certainly, electronic control units in vehicles of different models and body styles vary according to structural settings and required functions.

The electronic control units in the vehicle are generally communicatively connected by using a vehicle bus. Each of the electronic control units uses a specific communication protocol. The electronic control unit performs communication on a corresponding vehicle bus in accordance with a communication protocol that is used by the electronic control unit, to avoid conflicts and improve efficiency. That is, electronic control units that use the same communication protocol perform communication on one vehicle bus. One vehicle bus corresponds to one communication protocol. In automotive engineering, the vehicle bus is a specialized internal communications network that interconnects components inside a vehicle (e.g., automobile, bus, train, industrial or agricultural vehicle, ship, or aircraft). Special requirements for vehicle control such as assurance of message delivery, of non-conflicting messages, of minimum time of delivery, of low cost, and of EMF noise resilience, as well as redundant routing and other characteristics mandate the use of less common networking protocols. Protocols include Controller Area Network (CAN), Local Interconnect Network (LIN) and others.

In order to facilitate daily overhaul and maintenance, the vehicle 10 may further include at least one hardware communication interface (such as an OBD interface). The hardware communication interface and the vehicle 10 may be connected to one or more vehicle buses for establishing a communicative connection to an external device, so that the external device exchanges data with the electronic control unit, or the like.

The vehicle diagnostic device 20 may be any type of vehicle diagnostic apparatus and includes at least one device host and a connecting cable extending outward from the device host. A tail end of the connecting cable is a diagnostic connector mated with the hardware communication interface of the vehicle 10.

The vehicle diagnostic device 20 establishes a physical communication connection to various vehicle buses in the vehicle through the diagnostic connector and the hardware communication interface and loads a proper or paired protocol configuration to exchange data with the electronic control system, for example, transmit a scan signal or receive a reply data packet.

Figure 2:
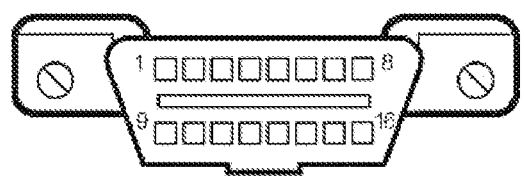
FIG. 2 is a schematic diagram of a diagnostic connector in accordance with a preferred embodiment of the present disclosure.

FIG. 2 is a schematic diagram of a diagnostic connector according to a preferred embodiment of the present disclosure. As shown in FIG. 2, a large number of pins are integrated on the diagnostic connector and each of the pins has a specific function.

The pins may be classified into different groups according to different communication protocols and functions. For example, pin 6 and pin 14 are communication pins of the CAN protocol, pin 7 and pin 15 are communication pins of the ISO9141 protocol and pin 2 and pin 10 are communication pins of the PWM protocol.

Therefore, when the diagnostic device 20 connects to the vehicle 10 using the diagnostic connector, the diagnostic device 20 establishes a physical connection to two or more vehicle buses and respectively exchanges data with the electronic control units on different vehicle buses after invoking the communication protocol integrated in the diagnostic device 20.

Each of the vehicle buses has a corresponding scan list. The scan list includes all to-be-scanned electronic control units. The communication protocol may specifically be determined according to an actual condition (for example, a model and a body style of a vehicle), which is usually integrated in the vehicle diagnostic device and may be invoked when required.

In some embodiments, the device host determines one or more scan lists according to a model and a body style of a vehicle to which the device host is connected and a communication protocol used by the electronic control unit or a vehicle bus to which the electronic control unit is connected. That is, the electronic control units communicating on the same vehicle bus and connected to each other belong to the same scan list.

In this way, corresponding scan lists may be formed for different models and body styles, which facilitates improvement of efficiency of scanning.

FIG. 3 is a schematic diagram of a scan list according to an embodiment of the present disclosure. As shown in FIG. 3, the vehicle includes 9 numbers of to-be-scanned items: an electronic control unit A to an electronic control unit H. The electronic control units are classified into the following three categories according to different communication protocols that are used: electronic control units A to D belong to a scan list 1, electronic control units E to F belong to a scan list 2 and electronic control units G and H belong to a scan list 3.

Since information transmission between different vehicle buses is independent of each other without interference, the device host may transmit a scan signal on different vehicle buses in parallel according to the scan list corresponding to each of the vehicle buses, to determine whether the to-be-scanned electronic control unit in the scan list exists in the vehicle 10.

Through transmission of a scan signal in parallel, presence or absence of two or more electronic control units can be detected. Compared with a usual method of detecting the electronic control units one by one during the automatic scanning by the vehicle diagnostic device, the parallel scanning in this way enables detection of two or more electronic control units at the same moment, multiplying the efficiency of automatic scanning.

Figure 4:
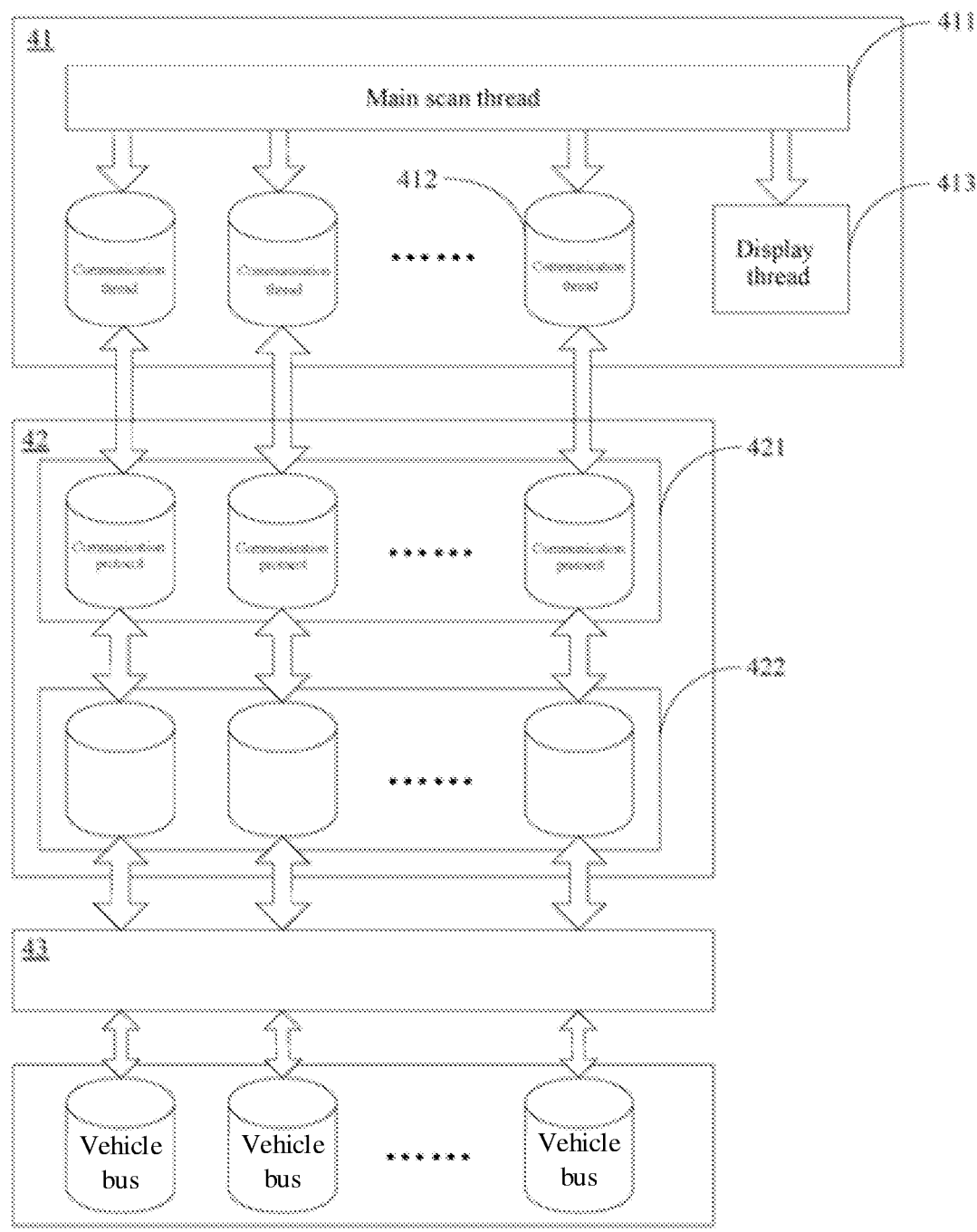
FIG. 4 is a schematic structural diagram of the vehicle diagnostic device according to an embodiment of the present disclosure.

In some embodiments, as shown in FIG. 4, the device host may adopt a structure with an upper computer 41 and a lower computer 42. The upper computer 41 and the lower computer 42 are communicatively connected and the lower computer 42 is electrically connected to the diagnostic connector 43 and is connected to vehicle buses through a hardware communication interface of the vehicle 10.

The upper computer 41 is a computer device that can directly deliver control commands. The upper computer 41 is located at a top layer of user interaction and may display various feedback information (such as results of the automatic scanning) to a user on a screen or collect a user instruction to deliver a corresponding control instruction. Specifically, the upper computer 41 may selectively be any other type of computer devices, such as a personal computer, a tablet computer, a mobile phone, or other intelligent electronic terminals with input/output devices.

The lower computer 42 is a computer that directly controls a device to obtain a vehicle status or related parameters. The lower computer 42 is usually configured to receive the control instructions delivered by the upper computer and convert the control instructions to corresponding timing signals for directly controlling the vehicle 10, or is configured to read status data (which is generally an analog quantity) of the vehicle and then convert the status data to a digital signal and feed the digital signal back to the upper computer. Specifically, the lower computer 42 may be implemented by a PLC, a single-chip microcomputer, a microprocessor or some other low-level processors and is located at a bottom layer of user interaction.

The upper computer 41 and the lower computer 42 each include at least one processor and a memory. Both the upper computer 41 and the lower computer 42 may perform one or more functional steps by invoking, by the processor, related computer software program instructions stored in the memory.

In this embodiment, the automatic scanning by the diagnostic device may be roughly divided into data processing at three different levels: an application layer, a link layer and a physical layer. As shown in FIG. 4, the data processing at the application layer is performed by the upper computer, and the application layer includes a main scan thread 411 and a plurality of communication threads 412.

The main scan thread 411 is a main control part and is configured to establish a corresponding communication thread for each vehicle bus and delete the corresponding communication threads after all to-be-scanned electronic control units in the scan list of the vehicle bus are scanned.

For example, as shown in FIG. 4, n communication threads 412 matching n types of vehicle buses are created. A corresponding communication thread 412 is closed or deleted after a scanning task of a vehicle bus is completed.

Each of the communication threads 412 corresponds to a vehicle bus. Different communication threads 412 are independent of each other and are executed in parallel. The communication thread is responsible for data interaction on the vehicle bus, for example, transmits an inquiry command to the to-be-scanned electronic control unit in the scan list on the corresponding vehicle bus and determines whether reply information returned by the to-be-scanned electronic control unit based on the inquiry command is received within a predetermined time, for example, 2 seconds.

Specifically, when the communication thread 412 does not receive the reply information, the communication thread may determine that the to-be-scanned electronic control unit does not exist. When the reply information is received, the communication thread may determine that the to-be-scanned electronic control unit exists and parse the reply information to determine an operating status of the to-be-scanned electronic control unit.

In some other embodiments, the application layer further includes a display thread 413, which is mainly configured to display, on a display screen of the upper computer, presence or absence of the electronic control unit determined by the communication thread 412 and a parsing result obtained by parsing the reply information. The display thread 413 may adopt any suitable displaying way, for example, a simple form of fault code to indicate whether the electronic control unit exists and a specific operating status of the electronic control unit that exists.

The fault code may be any suitable identification system. There is a correspondence between operating statuses of the electronic control unit under various conditions and specific identifiers, so that the operating status of the electronic control unit can be simply indicated.

The link layer 421 and the physical layer are both arranged in the lower computer 42. The link layer of the lower computer 42 simultaneously uses a plurality of communication protocols to convert, in accordance with a communication protocol used on a vehicle bus corresponding to the communication thread 412, an inquiry command that need to be transmitted by the communication thread, to generate a series of binary signals. In this embodiment, each of the vehicle buses corresponds to a communication protocol and each communication protocol corresponds to a vehicle bus.

For example, as shown in FIG. 4, the n numbers of communication protocols corresponding to the n numbers of communication threads are used to convert the inquiry command to a proper binary signal.

The physical layer 422 performs data processing at a bottom layer, which directly communicates with a physical connection channel formed by the diagnostic connector, and is configured to implement mutual conversion between a physical electrical signal and a binary signal. That is, the binary signal corresponding to the inquiry command is converted to a physical electrical signal, which is transmitted to the electronic control unit by the corresponding vehicle bus, or a physical electrical signal fed back by the electronic control unit is received and a binary signal of corresponding reply information is extracted through conversion.

Based on the application layer, the link layer and the physical layer, a plurality of communication channels may be established based on the physical connection of the diagnostic connector 43 for simultaneously transmitting an inquiry command and receiving reply information to implement parallel scanning of the electronic control units, thereby effectively improving the efficiency of automatic scanning and reducing the time required for automatic scanning.

A person skilled in the art should further understand that the circuit structure described in the embodiments of the present disclosure can be implemented in electronic hardware, computer software or a combination thereof. To clearly illustrate the interchangeability of hardware and software, the compositions and the steps performed by the various exemplary circuits have been generally described in the above description in terms of functionality. Whether the functions are executed in a mode of hardware or software depends on particular applications and design constraint conditions of the technical solutions.

Different methods may be used to implement the described functions for each particular application, but it should not be considered that such implementation goes beyond the scope of the present disclosure. The computer software may be stored in a non-transitory computer-readable storage medium. When being executed, the program may include the processes of the embodiments of the foregoing methods. The storage medium may be a magnetic disk, an optical disc, a read-only memory (ROM), or a random access memory (RAM).

Figure 5:
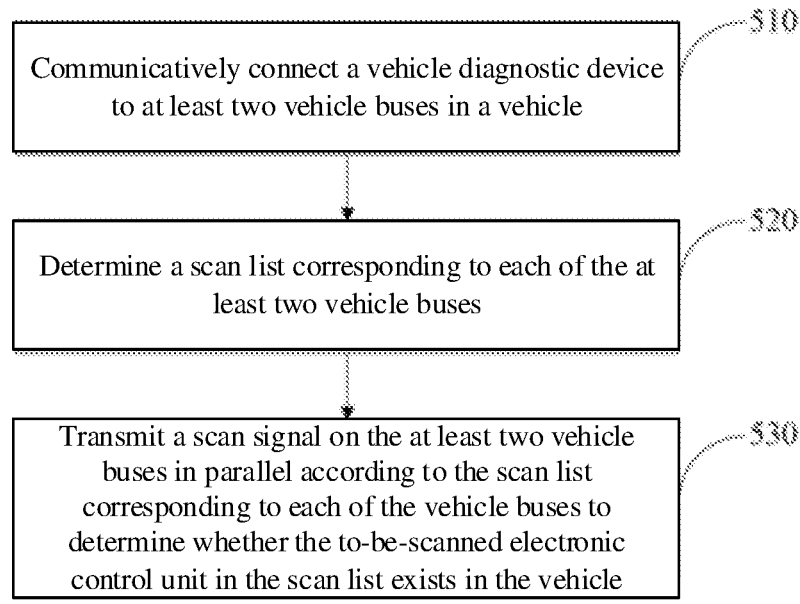
FIG. 5 is a flowchart of a scanning method for an electronic control unit of a vehicle in accordance with a preferred embodiment of the present disclosure.

Based on the process of the automatic scanning performed by the vehicle diagnostic device disclosed in the above embodiments, an embodiment of the present disclosure further provides an automatic scanning method for an electronic control unit. FIG. 5 is a flowchart of an automatic scanning method according to a preferred embodiment of the present disclosure. As shown in FIG. 5, the automatic scanning method includes the following steps.

510: Communicatively connecting a vehicle diagnostic device to at least two vehicle buses in a vehicle.

Each of the at least two vehicle buses is configured to be connected the vehicle diagnostic device to at least one electronic control unit in the vehicle.

In the embodiment, the vehicle diagnostic device integrated with various communication protocols may be communicatively connected to various vehicle buses through any type of diagnostic connector integrated with a plurality of pins.

A number of vehicle bus to which the vehicle diagnostic device is to be communicatively connected to depends on a specific status of the vehicle diagnostic device. In this embodiment, a communication link is established for a vehicle bus corresponding to each scan list.

520: Determine a scan list corresponding to each of the at least two vehicle buses.

The scan list includes a to-be-scanned electronic control unit. A specific scan list may depend on model information and body style information of a vehicle to which the diagnostic connector is connected. Each of the vehicle buses has a corresponding scan list.

Through determining the scan list according to the information of the model and body style of vehicles in this way, electronic control units required to be scanned may be adjusted according to specific different vehicles to which the vehicle diagnostic device is connected, facilitating improvement of the efficiency of the scanning.

530: Transmit a scan signal on the at least two vehicle buses in parallel according to the scan list corresponding to each of the vehicle buses, to determine whether the to-be-scanned electronic control unit in the scan list exists in the vehicle.

Since different vehicle buses are independent of each other and physically isolated, transmission of information on different vehicle buses does not affect each other. Based on such characteristics, a signal may be transmitted in parallel or simultaneously to electronic control units that communicate on different vehicle buses, to determine whether the to-be-scanned electronic control unit in the scan list exists in the vehicle.

Figure 6:
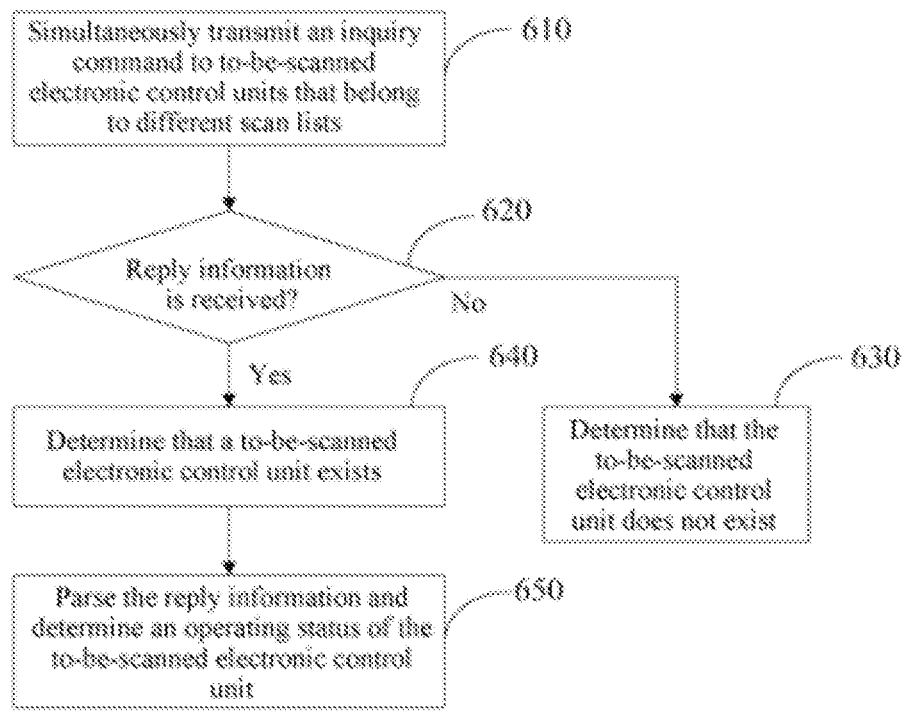
FIG. 6 is a flowchart of a scanning method for an electronic control unit of a vehicle in accordance with another embodiment of the present disclosure.

In some embodiments, as shown in FIG. 6, the parallel scanning may specifically include the following steps.

610: Simultaneously transmit an inquiry command to to-be-scanned electronic control units in different scan lists.

The inquiry command is a preset instruction transmitted to a specific electronic control unit for requesting the electronic control unit to feed back its current operating status. Specifically, the inquiry command may adopt any suitable structure.

620: Determine whether reply information returned by the to-be-scanned electronic control unit based on the inquiry command is received within a predetermined time, for example 2 seconds. If the reply information is not received, step 630 is performed, and if the reply information is received, step 640 is performed.

After receiving the inquiry command, the electronic control unit makes a response and feeds back the reply information, so that the operating status of the electronic control unit can be read or learned. Similarly, the reply information fed back by electronic control units belonging to different categories does not conflict with each other and may be transmitted and parsed at the same time.

630: Determine that the to-be-scanned electronic control unit does not exist in the vehicle.

Specifically, the status in which the electronic control unit does not exist may be indicated by proper fault code.

640: Determine that the to-be-scanned electronic control unit exists in the vehicle.

650: Parse the reply information to determine an operating status of the to-be-scanned electronic control unit.

The operating status indicates a current device status of the electronic control unit, which may be used as assistance information to help maintenance or maintenance personnel to better understand the status of the vehicle 10.

Specifically, each of the vehicle buses corresponds to a communication protocol and each communication protocol corresponds to a vehicle bus. Therefore, the scan signal may be transmitted on the at least two vehicle buses in parallel according to the communication protocol corresponding to each of the at least two vehicle buses.

Based on the above, according to the scanning method provided in the embodiments of the present disclosure, the electronic control units belonging to different scan lists are scanned in parallel, while a plurality of electronic control units belonging to the same scan list are scanned one by one, which effectively improve a scanning speed compared with the method of scanning all of the electronic control units one by one.

Figure 7:
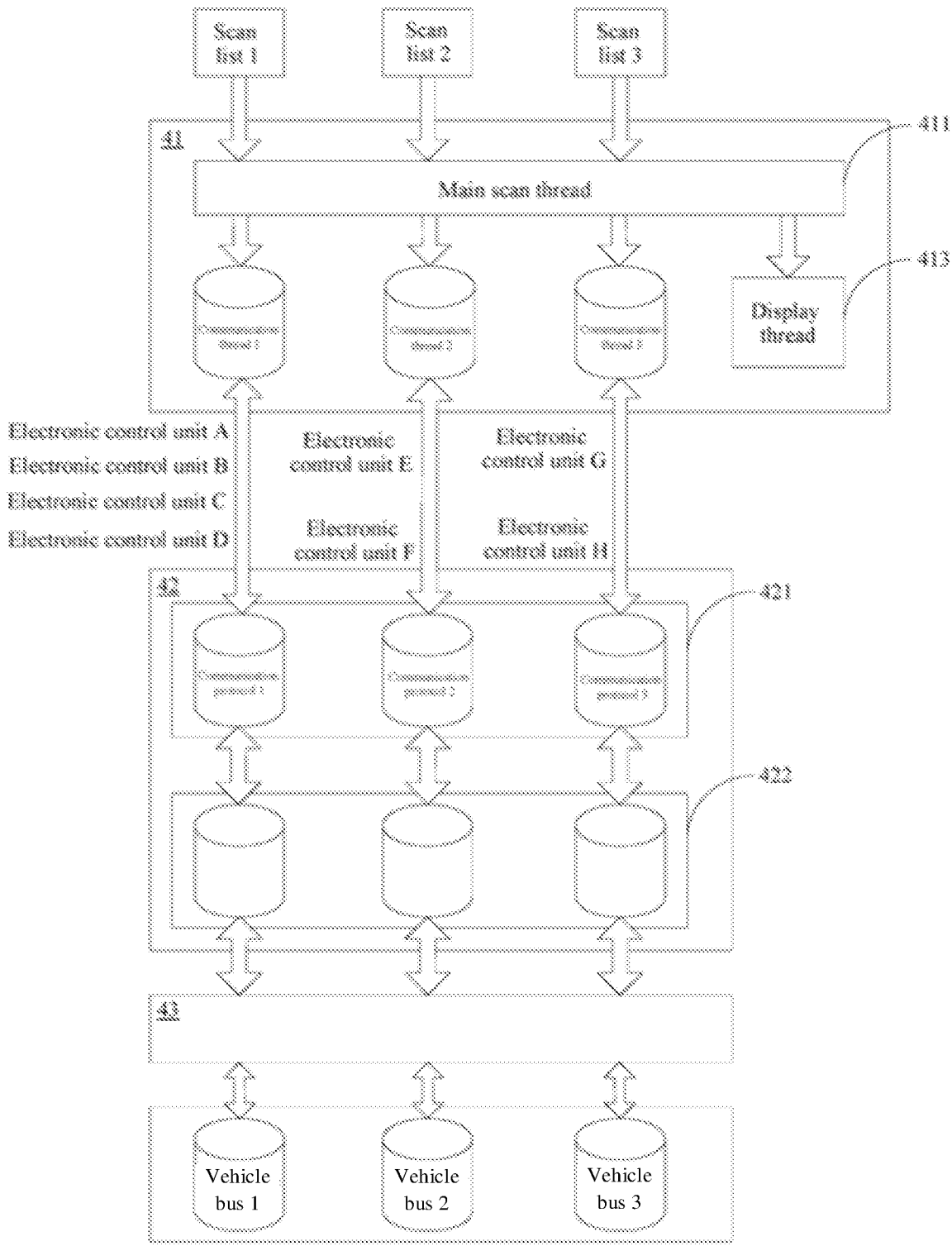
FIG. 7 is a schematic diagram of a preferred vehicle diagnostic device in a scan list shown in FIG. 3.

FIG. 7 shows a specific example of performing automatic scanning on the scan list shown in FIG. 3. As shown in FIG. 7, the vehicle diagnostic device establishes three independent and non-interacting communication links based on the communication protocol integrated into the vehicle diagnostic device and the physical cable connection provided by the diagnostic connector.

The main scan thread at the application layer creates a communication thread 1, a communication thread 2 and a communication thread 3 according to the classification result, which are respectively configured to manage communicative interaction between the electronic control units in the scan list 1, the scan list 2 and the scan list 3.

The link layer has the CAN protocol, the ISO9141 protocol and the PWM protocol respectively corresponding to the scan list 1, the scan list 2 and the scan list 3, and implements conversion between data information and a binary signal according to a corresponding communication protocol. The physical layer follows the link layer and is used for conversion between a binary signal and a physical electrical signal. The signals are transmitted through a vehicle bus 1, a vehicle bus 2 and a vehicle bus 3.

Based on three mutually independent communication links, during actual scanning, the communication thread 1, the communication thread 2 and the communication thread 3 simultaneously transmit an inquiry command to a corresponding electronic control unit (such as the electronic control unit A, the electronic control unit E or the electronic control unit G) in a form of a physical electrical signal through the link layer and the physical layer.

Then reply information returned by the electronic control units is received through the physical layer and the link layer and content of the reply information is parsed and provided to the display thread. The display thread may display operating statuses of the electronic control units A, E and F in a form of fault code.

Upon completion of the scanning of the first electronic control unit, the communication thread 1, the communication thread 2 and the communication thread 3 may continue to scan other electronic control units of a corresponding category.

After the main scan thread completes scanning of all electronic control units of a certain category, the communication thread for the category may be closed. For example, upon completion of scanning of the electronic control units in the scan list 2, the communication thread 2 may be closed.

In the embodiments of the present disclosure, the scan list is determined according to information of the model and the body style of the vehicle, and different scan lists are scanned in parallel based on the plurality of independent and non-interacting communication links and the operating statuses of the plurality of electronic control units are inquired simultaneously, thereby reducing the time required for the automatic scanning and providing better user experience.

A method consistent with the disclosure can be implemented in the form of computer program stored in a non-transitory computer-readable storage medium, which can be sold or used as a standalone product. The computer program can include instructions that enable a computing device, such as a processor, a personal computer, a tablet computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

In the present disclosure, a physical circuit of the receiving circuit may include, for example, a receiver, and a physical circuit of the control circuit may include, for example, a processor. The processor may include, for example, a central processing unit (CPU). The receiver may include, for example, an antenna having a receiving function or an antenna having transmitting and receiving functions. The vehicle diagnostic device may further include a memory storing instructions that, when executed by the processor, control the process to execute a method consistent with the disclosure, such as one of the example method described above. The memory can include, for example, a USB disk, a mobile hard disk, a read-only memory (ROM), a random access memory (RAM), a magnetic disk, or an optical disk.

It should be noted that the foregoing embodiments are merely used to describe the technical solutions of the present disclosure, but are not intended to limit the present disclosure. Under the concept of the present disclosure, the technical features in the foregoing embodiments or different embodiments may be combined, the steps may be implemented in any sequence, and there may be many other changes in different aspects of the present disclosure. For brevity, those are not provided in detail. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A scanning method for an electronic control unit in a vehicle, the scanning method comprising steps of:
   communicatively connecting a vehicle diagnostic device to at least two vehicle buses in the vehicle, each of the at least two vehicle buses being connected to at least one electronic control unit in the vehicle;
   determining a scan list corresponding to each of the at least two vehicle buses, the scan list comprising a to-be-scanned electronic control unit; and
   transmitting a scan signal on the at least two vehicle buses in parallel according to the scan list corresponding to each of the vehicle buses, to determine whether the to-be-scanned electronic control unit in the scan list exists in the vehicle;
   wherein the step of transmitting a scan signal on the at least two vehicle buses in parallel comprises:
   transmitting the scan signal on the at least two vehicle buses in parallel according to a communication protocol corresponding to each of the at least two vehicle buses, wherein each of the vehicle buses corresponds to a communication protocol, and each communication protocol corresponds to an vehicle bus.

2. The scanning method according to claim 1, further comprising a step of:
   determining model information and body style information of the vehicle,
   wherein the step of determining a scan list corresponding to each of the at least two vehicle buses comprises:
   determining the scan list corresponding to each of the at least two vehicle buses according to the model information and the body style information of the vehicle.

3. The scanning method according to claim 2, wherein the step of transmitting a scan signal on the at least two vehicle buses in parallel according to the scan list corresponding to each of the vehicle buses, to determine whether the to-be-scanned electronic control unit in the scan list exists in the vehicle comprises:
   simultaneously transmitting an inquiry command to to-be-scanned electronic control units in different scan lists;
   determining whether reply information returned by the to-be-scanned electronic control unit based on the inquiry command is received within a predetermined time; and
   if the reply information is not received, determining that the to-be-scanned electronic control unit does not exist in the vehicle.

4. The scanning method according to claim 3, wherein after the step of simultaneously transmitting an inquiry command to electronic control units of different lists, the method further comprises:
   determining that the to-be-scanned electronic control unit exists in the vehicle when the reply information returned by the to-be-scanned electronic control unit based on the inquiry command is received within the predetermined time; and
   parsing the reply information to determine an operating status of the to-be-scanned electronic control unit.

5. A vehicle diagnostic device, comprising:
   a device host and a diagnostic connector; wherein
   the diagnostic connector is configured to connect the device host to a vehicle bus, at least two sets of pins being integrated on the diagnostic connector, each set of pins being connected to a vehicle bus, each of the vehicle buses being connected to at least one electronic control unit in a vehicle, each of the vehicle buses having a corresponding scan list, and the scan list comprising a to-be-scanned electronic control unit; and
   the device host is communicatively connected to at least two automobile buses through the diagnostic connector, and the device host is configured to transmit a scan signal on the at least two vehicle buses in parallel according to the scan list corresponding to each of the vehicle buses, to determine whether the to-be-scanned electronic control unit in the scan list exists in the vehicle; wherein transmitting a scan signal on the at least two vehicle buses in parallel comprises:
   transmitting the scan signal on the at least two vehicle buses in parallel according to a communication protocol corresponding to each of the at least two vehicle buses, wherein each of the vehicle buses corresponds to a communication protocol, and each communication protocol corresponds to an vehicle bus.

6. The vehicle diagnostic device according to claim 5, wherein the device host is further configured to:
- determine the scan list corresponding to each of the at least two vehicle buses according to model information and body style information of a to-be-scanned vehicle.

7. The vehicle diagnostic device according to claim 5, wherein the device host comprises an upper computer and a lower computer, the lower computer being electrically connected to the diagnostic connector;
- the upper computer being communicatively connected to the lower computer to transmit the scan signal on the at least two vehicle buses in parallel through the lower computer, the upper computer comprising a main scan thread and a plurality of communication threads;
- the main scan thread being configured to create a corresponding communication thread for each of the vehicle buses, and delete the corresponding communication thread after all to-be-scanned electronic control units in the scan list of the vehicle bus are scanned;
- different communication threads being executed in parallel, the communication thread being configured to transmit an inquiry command on a corresponding vehicle bus to the to-be-scanned electronic control unit in the scan list, determine whether reply information returned by the to-be-scanned electronic control unit based on the inquiry command is received within a predetermined time, and if the reply information is not received, determine that the to-be-scanned electronic control unit does not exist in the vehicle.

8. The vehicle diagnostic device according to claim 7, wherein the communication thread is further configured to:
- determine that the to-be-scanned electronic control unit exists in the vehicle when the reply information returned by the to-be-scanned electronic control unit is received within the predetermined time; and
- parse the reply information to determine an operating status of the to-be-scanned electronic control unit.

9. The vehicle diagnostic device according to claim 8, wherein the lower computer comprises a link layer and a physical layer, each of the vehicle buses corresponds to a communication protocol, and each communication protocol corresponds to a vehicle bus,
- the link layer being configured to convert the inquiry command and the reply information to a corresponding binary signal according to the communication protocol corresponding to each of the vehicle buses; and
- the physical layer being configured to convert the binary signal to a physical electrical signal for transmission on the corresponding vehicle bus, or receive a physical electrical signal returned by the vehicle bus and convert the physical electrical signal to a corresponding binary signal.

10. The vehicle diagnostic device according to claim 7, wherein the lower computer comprises a link layer and a physical layer, each of the vehicle buses corresponds to a communication protocol, and each communication protocol corresponds to a vehicle bus,
- the link layer being configured to convert the inquiry command and the reply information to a corresponding binary signal according to the communication protocol corresponding to each of the vehicle buses; and
- the physical layer being configured to convert the binary signal to a physical electrical signal for transmission on the corresponding vehicle bus, or receive a physical electrical signal returned by the vehicle bus and convert the physical electrical signal to a corresponding binary signal.

11. The scanning method according to claim 5, wherein transmitting a scan signal on the at least two vehicle buses in parallel comprises:
- transmitting the scan signal on the at least two vehicle buses in parallel according to a communication protocol corresponding to each of the at least two vehicle buses; and wherein each of the vehicle buses corresponds to a communication protocol, and each communication protocol corresponds to an vehicle bus.

12. The scanning method according to claim 11, wherein transmitting a scan signal on the at least two vehicle buses in parallel comprises:
- transmitting the scan signal on the at least two vehicle buses in parallel according to a communication protocol corresponding to each of the at least two vehicle buses; and wherein each of the vehicle buses corresponds to a communication protocol, and each communication protocol corresponds to an vehicle bus.

13. A non-transitory computer-readable storage medium with at least one computer-readable instruction stored thereon, which is executed by at least one processor to perform the following steps:
- communicatively connecting a vehicle diagnostic device to at least two vehicle buses in the vehicle, each of the at least two vehicle buses being connected to at least one electronic control unit in the vehicle;
- determining a scan list corresponding to each of the at least two vehicle buses, the scan list comprising a to-be-scanned electronic control unit; and
- transmitting a scan signal on the at least two vehicle buses in parallel according to the scan list corresponding to each of the vehicle buses, to determine whether the to-be-scanned electronic control unit in the scan list exists in the vehicle; wherein the step of transmitting a scan signal on the at least two vehicle buses in parallel comprises:
- transmitting the scan signal on the at least two vehicle buses in parallel according to a communication protocol corresponding to each of the at least two vehicle buses, wherein each of the vehicle buses corresponds to a communication protocol, and each communication protocol corresponds to an vehicle bus.

14. The non-transitory computer-readable storage medium according to claim 13, wherein the at least one computer-readable instruction is executed by the at least one processor to further perform steps of:
- determining model information and body style information of the vehicle;
- wherein the step of determining a scan list corresponding to each of the at least two vehicle buses comprises:
- determining the scan list corresponding to each of the at least two vehicle buses according to the model information and the body style information of the vehicle.

15. The non-transitory computer-readable storage medium according to claim 14, wherein the step of transmitting a scan signal on the at least two vehicle buses in parallel according to the scan list corresponding to each of the vehicle buses, to determine whether the to-be-scanned electronic control unit in the scan list exists in the vehicle comprises:
- simultaneously transmitting an inquiry command to to-be-scanned electronic control units in different scan lists;
- determining whether reply information returned by the to-be-scanned electronic control unit based on the inquiry command is received within a predetermined time; and if the reply information is not received, determining that the to-be-scanned electronic control unit does not exist in the vehicle.

16. The non-transitory computer-readable storage medium according to claim 15, wherein after the step of simultaneously transmitting an inquiry command to electronic control units of different lists, the method further comprises:

determining that the to-be-scanned electronic control unit exists in the vehicle when the reply information returned by the to-be-scanned electronic control unit based on the inquiry command is received within the predetermined time; and parsing the reply information to determine an operating status of the to-be-scanned electronic control unit.

\* \* \* \* \*